United States Patent [19]
McCabe

[11] 3,969,742
[45] July 13, 1976

[54] AUTOMATIC ENGAGEMENT AND METERING ADJUSTMENT CONTROLS FOR METERING BLADE DEVICE

[75] Inventor: Peter McCabe, Godalming, England

[73] Assignee: Addressorgraph Multigraph Corporation, Cleveland, Ohio

[22] Filed: Apr. 25, 1974

[21] Appl. No.: 464,093

[30] Foreign Application Priority Data
Apr. 24, 1974 Belgium .................................. 143519

[52] U.S. Cl. ............................... 354/318; 118/247; 118/261
[51] Int. Cl.² ............................................. G03D 5/06
[58] Field of Search ............. 118/244, 248, DIG. 23, 118/260, 261, 247; 354/318, 324

[56] References Cited
UNITED STATES PATENTS

| | | | |
|---|---|---|---|
| 998,221 | 7/1911 | Wheeler | 118/261 |
| 1,968,911 | 8/1934 | Potdevin | 118/261 |
| 3,640,203 | 2/1972 | Raab et al. | 118/261 X |
| 3,702,096 | 11/1972 | Copeland | 118/261 X |
| 3,704,661 | 12/1972 | Johnson et al. | 118/261 X |
| 3,704,662 | 12/1972 | Johnson et al. | 118/261 X |

FOREIGN PATENTS OR APPLICATIONS

| | | | |
|---|---|---|---|
| 337,627 | 6/1921 | Germany | 118/248 |

*Primary Examiner*—John P. McIntosh

[57] ABSTRACT

The mechanism of this invention deals with a series of gears for sequentially moving and controlling a pair of blade-like members associated with a liquid applicator roller, one of said blades serving to wipe excess liquid from the surface of the roller, and the other blade serving to press a sheet of paper against the applicator roller in order to transfer the metered amount or controlled amount of liquid from the roller surface to the paper. The gear train includes a manually movable gear for rendering operative a sequence control gear for bringing the blades into contact and out of contact with the surface of the roller, which sequence control gear has associated with it various linkage members and latching members for holding the blades in position against the surface of the roller and for triggering the drive motor for rotating the liquid applicator roller.

19 Claims, 8 Drawing Figures

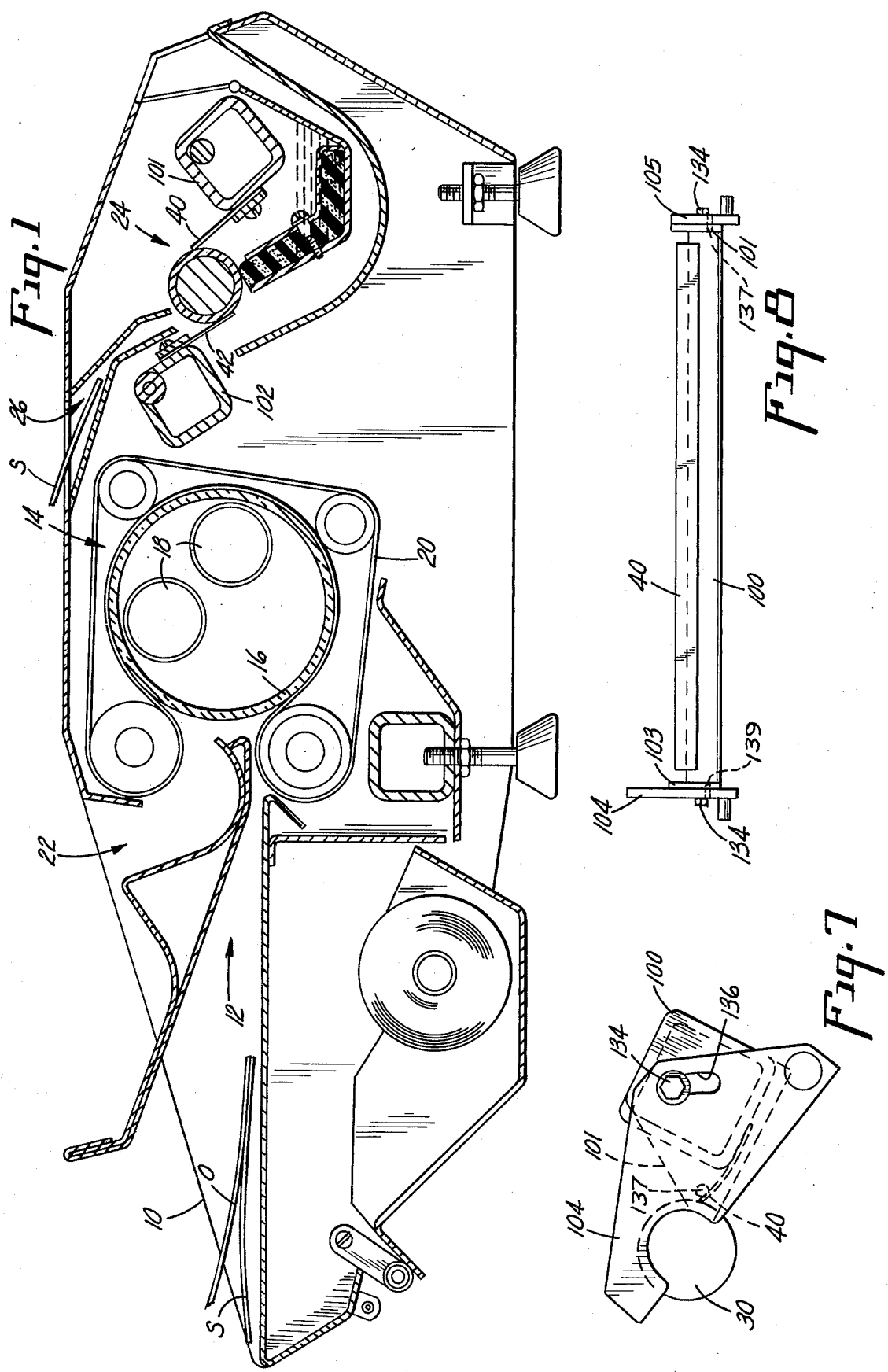

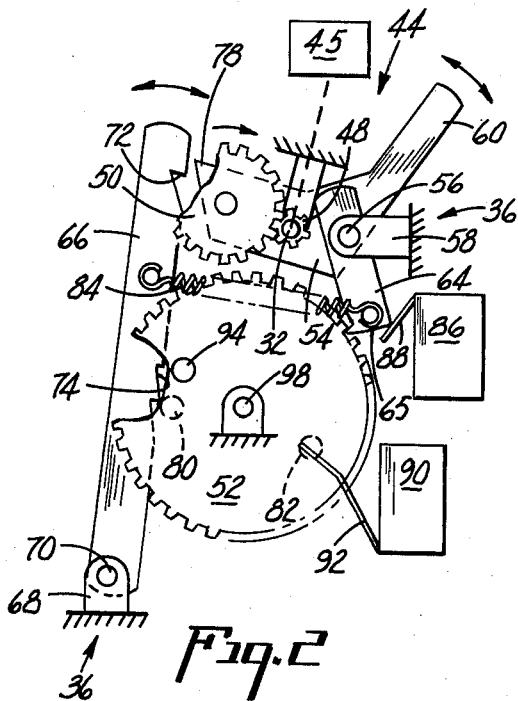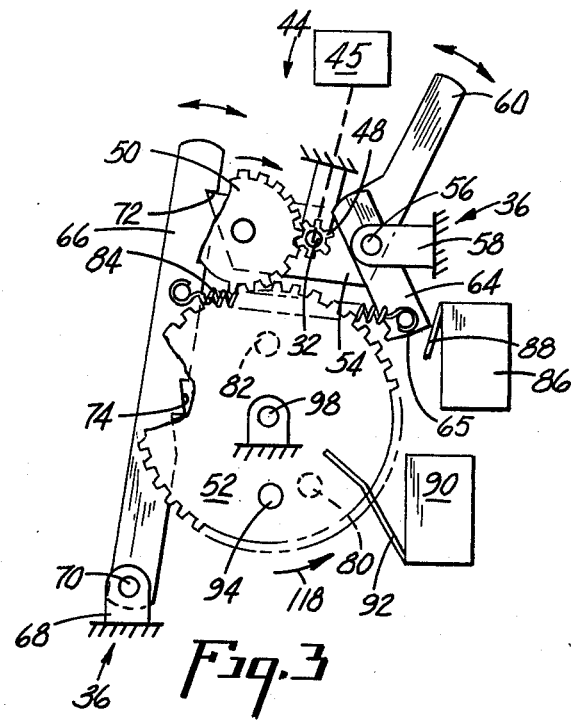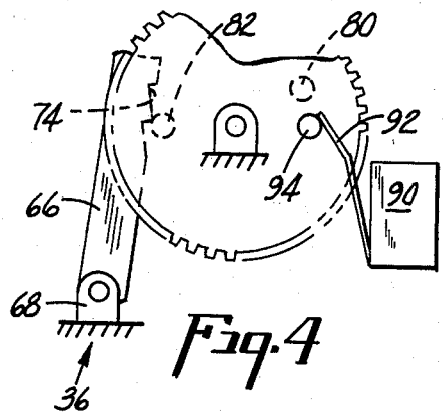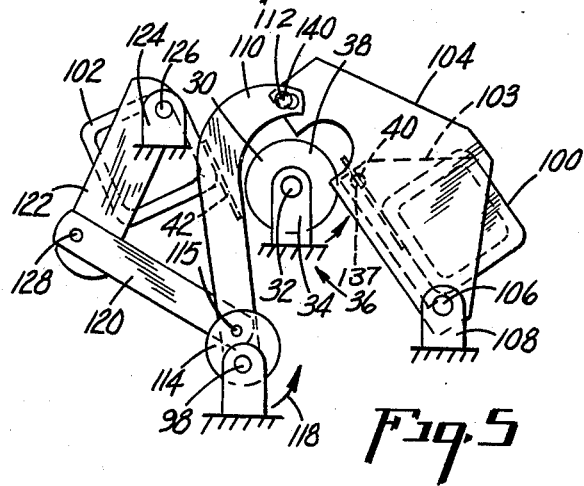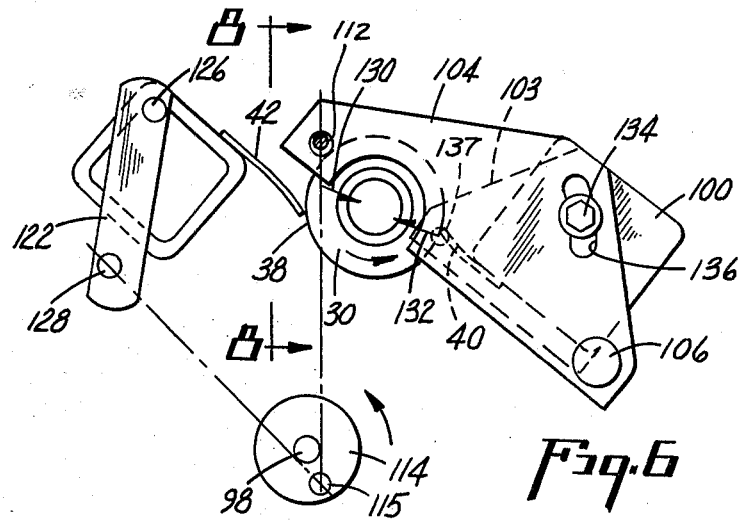

AUTOMATIC ENGAGEMENT AND METERING ADJUSTMENT CONTROLS FOR METERING BLADE DEVICE

BACKGROUND OF THE INVENTION

This invention relates generally to a developing device useful in diazotype reproduction apparatus, and more particularly, to the automatic control and operation of metering elements for controlling the amount of liquid developing agent that is applied to the light-sensitive diazotype papers.

The developing devices that are employed in reproducing apparatus which use diazotype sensitized sheets and rely on the application thereto of metered quantities of a liquid developing agent are well known. The devices generally comprise a motor-driven applicator roller having a special surface capable of carrying a metered quantity of developing liquid on the surface thereof and a wiper blade for removing the excess liquid. In addition to such a wiper blade, there is provided a pressure blade which is positioned against the surface of the roller which serves to press the light-sensitive diazotype paper against the surface to transfer the metered amount of liquid thereon.

Both the wiper blade and the pressure blade are assembled in a position adjacent to the applicator roller in such a manner so as to be moved into an operative position and out of an operative position in a certain prescribed manner, automatically; and further, to make adjustments in the wiper blade so as to increase or decrease its metering effect.

A known device of this kind is in use in diazotype developing machines which employ a cam control with cam followers for automatically controlling and operating the movement of the pressure blade and wiper blade in relation to the applicator roller. Such cam control devices are fully satisfactory; however, they are not without certain deficiencies. Such deficiencies reside in the complexity of the construction and because of its complexity, the high cost of fabricating such a mechanism. For example, such a cam mechanism requires a driving system comprising two separate motors and a special electrical circuit for each of such motors. Moreover, the mechanism requires considerable space within the reproducing apparatus thereby increasing the overall size of the equipment.

SUMMARY OF THE INVENTION

It is a principal object of the present invention to overcome the drawbacks of the prior known devices by providing a mechanism of simple construction and operation while insuring the highly reliable operation which is at least as satisfactory as the hereinbefore known mechanism.

For the purpose of achieving this primary objective, the developing device of the instant invention comprises a gear assembly mounted between the driving motor of the applicator roller and said blade members which establishes a mechanical linkage between said drive motor and the blades when the position of the blades has to be changed with reference to the applicator roller. At the moment when the blades are brought into contacting relationship with the applicator roller, the gear assembly serves the important function of disengaging the blades from the motor to the inoperative condition.

In achieving the advantages of the mechanism, the gear assembly comprises a driving gear fixed on the same shaft which rotatingly drives the applicator roller and is in cooperative association with an idler gear positioned so that it continuously meshes with said drive gear, a gear wheel which cooperates with the blade members, said idler gear being assembled in such a manner as to be movable to a condition where it is either free of the gear wheel or meshes therewith.

In achieving the more specific advantages of the invention, the developing device provides a series of levers, supported plates, latching members, and arms which interconnect and link the gear assembly and blade members in such a manner that the wiper blade and pressure blade are brought into their respective operative positions against the roller in a certain prescribed sequence.

A still further specific advantage is achieved by providing stop pins which are eccentrically mounted on the gear wheel which serve to actuate the various levers and latching members that control the movement of the blade members in response to certain angular displacement of said gear wheel about its axis of rotation as it moves in a definite direction so as to cause the wiper blade to come into operation prior in time to the pressure blade against the applicator roller and upon further rotation of the gear wheel to a second position of angular displacement which causes the blades to be moved to an inoperative position in spaced relation from the roller.

It is a still further specific object of the invention to provide means for adjusting the angular position of the wiper blade with respect to the applicator roll and thereby vary the quantity of developing liquid applied and carried on said applicator roller.

Such adjusting means are deemed extremely important since, because of the unavoidable variation in dimensions of the various instrumentalities comprising the developer apparatus and because of the discrepancies which may arise in the fabrication and the preparation of the external surface of the roller optimum operating conditions for the reproducing equipment can still routinely be achieved through the compensating effect available through making such adjustments in the quantity of developing agent to be applied to the sensitizing sheet.

Presently available developing equipment provides controls for adjusting the angle of inclination of the wiper blade with respect to the applicator roller in order to adjust the quantity of liquid. However, the known mechanism for making such changes in the angle of inclination are also accompanied by a corresponding change in the amount of pressure exerted by such a wiper blade against the surface area of the application roller.

The change in pressure against the roller is known to cause a slight deflection of the applicator roller along its center line of rotation. Such a deflection of the roller to an "off-center line" condition results in the uneven distribution of developing liquid over the roller surface which ultimately results in the application of uneven quantities of liquid across a wide sheet of paper passing between the pressure blade and the roller. Another problem resulting from such off-center line condition is that the uneven pressure causes the wide sheet ultimately to wrinkle and damage because of the uneven feeding speeds across the width of the roller.

Another specific object of the present invention is directed to overcome the aforedescribed difficulties as well as to provide a developing device as hereinbefore described, wherein the blades are applied to the roller surface so that the force resultant from the pressure vectors are at a radial direction and of the same absolute value and diametrically oppose one another.

One of the inventive features of the present invention is the mounting of the wiper blade in an adjustable angular position with reference to the applicator roller so as to establish a contact area, which area is positioned in a location of the roller diametrically opposed to the contact area of the pressure blade.

The wiper blade is advantageously secured to a blade carrier which is assembled on movable end plates within bracket mountings so that the blade support may be angularly displaced about a longitudinal axis located in the contact area of the wiper blade with the applicator roller; means being provided to lock the blade support relative to the mounting brackets between two end positions corresponding to a range of angular end positions of the wiper blade with reference to the applicator roller.

Other details and features of the invention will become apparent from the description hereinafter set forth, including the presentation of examples which are intended to be illustrative of the invention but not limiting thereof, reference being had to the accompanying drawings of some particular embodiments of the invention.

BRIEF DESCRIPTION OF THE DRAWINGS

FIG. 1 is a longitudinal cross section of a reproduction apparatus of the type which utilizes the automatic positioning controls and metering adjustments for the developer;

FIG. 2 is a diagrammatic side view of a portion of the control members of a developing device according to the invention shown at the "at rest" position;

FIG. 3 is a side view similar to that of FIG. 1, but showing a starting position of the device;

FIG. 4 is a diagrammatic representation of certain of the members shown in FIGS. 2 and 3 in an operating condition of the developing device;

FIG. 5 is a diagrammatic side view of the control members of the device shown in FIG. 2 but at the opposite end thereof in the at rest position;

FIG. 6 is a diagrammatic side view of a portion of the control members of the developing device in its operating condition, showing the means for adjusting the angular position of the wiper blade corresponding to the position shown in FIG. 4;

FIG. 7 is a diagrammatic view similar to that shown in FIG. 6 showing a different angular position for the wiper blade;

FIG. 8 is an elevational diagrammatic view taken along line 8—8 of FIG. 6.

In the different figures, the same numerical references are used to identify the similar or same elements.

The accompanying figures show a developing device of a reproducing apparatus for developing diazotype sensitized sheets by applying thereto a metered quantity of a developing liquid agent. Such a device may in particular be mounted in a reproducing apparatus of the types such as shown in FIG. 1 and which is more fully described in U.S. Pat. Nos. 3,704,661, 3,704,662, and 3,640,203, and which are assigned to the same assignee as the instant invention.

As the developing device according to the invention may be used with any reproduction apparatus of the type described in which small metered amounts of a developer are to be applied to the light-sensitive sheet, it is deemed unnecessary to describe in great detail the operation of such a system.

In order to show a reproduction apparatus of the type in which the device of the instant invention may be employed, reference is had to FIG. 1 showing such a machine having an outside shell or casing 10 which enclose the various instrumentalities for making the reproductions. At the front end of the machine, there is an in-feed station 12 into which are fed the copy sheet S and the original O which is guided into the exposure section identified with the general reference numeral 14. The exposure section is of a conventional type well known in the art comprising a rotatable translucent cylinder 16 containing one or more illumination sources 18 within the interior thereof for burning out the light-sensitive diazotype materials which are slidably moved over the surface of the cylinder by means of the carrier belt system 20.

The burned out copy sheet and tracing emerge from the exposure section 14 through the exit 22 where the two sheets are intercepted by the operator and separated.

The latent image bearing diazotype copy sheet S is then fed into the developer device 24 through the in-feed station 26.

Referring now to FIGS. 2, 3, 4, and 5, there is shown an applicator roller 30 which is rotatably mounted on a shaft 32, the ends of which are disposed in suitable bearing elements 34 which are fixedly secured to the frame 36 of the device as shown schematically in FIG. 4. The roller 30 is provided with a special surface 38 which is fully described in U.S. Pat. No. 3,640,203 and assigned to the same assignee as this invention. This special surface 38 is adapted to support a metered quantity of the developing liquid. The application of liquid to the developer roller in order to achieve the metered amount may be accomplished in a number of ways such as described in U.S. Pat. No. 3,640,203 but which techniques are not the subject of the present invention and therefore will not be described herein.

In order to remove the excess developing liquid from the roller surface 38, a wiper blade 40 is provided which is positioned adjacent the applicator roller 30 and is assembled in such a manner that it may be moved into and out of contact with the face of the roller as well as being adjusted with respect to its angular position relative to the longitudinal line of contact with the applicator roller.

A pressure blade 42 is also mounted in a position adjacent the roller 30 in a manner that renders it movable into and out of operation against the surface area 38 thereof in much the same manner as the wiper blade 40. The action of the pressure blade 42 against the surface 38 provides a developing zone extending longitudinally along the surface of the roller coincident with the contact area between the blade and the roller surface through which passes the sensitized sheet to be developed after it has been exposed at the exposure section 14 to produce a latent image on the surface of the light-sensitive sheet.

One of the important elements of the developing device of this invention as it is shown in the accompanying figures, is the gear assembly identified with the general reference numeral 44 which is positioned between the main drive motor 45 for the applicator roller 30 and the blades 40 and 42. It should be pointed out that successful operation of this invention does not require the blades 40 and 42 to be directly driven by the motor through the gear assembly 44.

The gear assembly 44 comprises a driving gear 48 which is fixed on the rotating shaft 32 of the applicator roller 30 and an idler gear 50 which continuously meshes with said driving gear 48. The idler gear 50 (FIG. 2 and 3) is assembled on a bracket 54 which is adapted to pivot about a shaft 56 which is mounted in a bearing 58, said bearing being integral with the frame shown schematically in FIG. 2 by the reference numeral 36. A gear wheel 52 cooperates with the blades 40 and 42 through a linkage to be described hereinafter. The bracket 54 is equipped with a lever arm 60 which permits the bracket to be pivoted about its shaft 56, as will be seen by the manual operation of the lever arm 60 (FIGS. 2 and 3). Thus, the idler gear 50 may be operated, put into a disengaged or free position with respect to the gear wheel 52 (FIG. 2) or to an engaged position where it meshes with the gear wheel (FIG. 3).

Associated with the bracket 54 is a latching member 64 which is pivotably mounted around the same shaft 56 having a dog 65 at its lower end which is adapted to be received between the teeth of the gear wheel 52.

Continuing with the description of FIGS. 2, 3, and 4, there is provided a control arm 66 which rises vertically, being hingedly mounted to a bracket 68 so that it turns about a shaft 70. The bracket 68 is secured to the frame 36 of the machine which is depicted schematically in FIGS. 2, 3, and 4. Along one face of the control arm are a series of cutouts or notches 72 and 74. These series of notches are positioned along the front face of the control arm 66 so that they line up with, or otherwise are in a position to respond to the movement of other elements in the assembly. Specifically, the notch 72 is in alignment with the projection 78 located at the forwardmost end of the bracket 54, and the notch 74 is located so as to be in the path of movement of the pins 80 and 82 (shown in dotted outline) on the back of the gear wheel 52. Interconnecting the latching members 64 and the control arm 66 is a coiled spring 84 causing these elements to be biased toward one another. It will be appreciated, therefore, that under the influence of the coiled spring 84, the arm 66 as shown in FIGS. 3 and 4 is caused to rotate clockwise and the latching member 64 similarly tends to be rotated in the clockwise direction.

Included in the structural arrangement are a pair of switches 86 and 90 each having an actuator 88 and 92, respectively. It will be observed that these switches are located in a position adjacent the latching member 64 and the gear wheel 52, respectively. The actuator 88 of switch 86 is in the path of rotary movement of the latching member 64 so that the switch is responsive to this member. The actuator 92 of the switch 90 is positioned in the path of a pin 94 which is affixed to the face of the gear wheel so that when the latter rotates, it will operate the actuator 92 of the switch 90. The switch 90 when actuated completes the circuit to the power supply after the switch 86 is opened, thereby maintaining the power to the drive motor 45.

As part of the electrical controls, it is desirable to have the motor operate at maximum speed when energized by switch 86 and when switch 90 is actuated a separate control (not shown) is connected into the circuit thereby permitting variable control of the drive speed.

The control arm 66 may take up one of two positions. The first position is one in which it holds the bracket 54 but supports the idler gear 50 in engagement with the gear wheel 52 (FIG. 3), and a second position in which the bracket 54 is in a released position disengaging the idler gear 50 from engagement with the gear wheel 52. In the second position, the dog 65 of the latching member 64 enagages one of the teeth of the gear wheel 52 (FIG. 2) thereby arresting further movement of the gear wheel. It will be appreciated that by locking or holding the gear wheel into its fixed position serves to lock the blades in their position against the roller 30 or in their inoperative position.

The movement of the control arm 66 is controlled directly by the eccentrically positioned stop pins 80 and 82 located counterclockwise predetermined angular distances in relation to one another, and are mounted, as described earlier, on the back of the gear wheel 52. As the gear wheel turns, each of the pins 80 and 82 will sequentially engage the notch 74, causing the control arm 66 to move in the counterclockwise direction against the tensioning force exerted by the coiled spring 84 urging it in the clockwise direction. It is the function of the pin 82 to cause the control arm 66 to be rotated in a counterclockwise direction about its shaft 70 as the gear wheel rotates in the counterclockwisse direction, thereby causing the pin to move in a circular path whenever the gear assembly 44 is in engagement therewith.

The pin 80 is also responsible for moving the control arm in a similar manner as does the pin 82 in response to rotation of the gear wheel, but in a time-related sequence which is a function of the angular spacing of two pins which again actuates the latching member 64 into its latched position arresting the rotation of the gear wheel (FIG. 2).

At such time when the control arm 66 is not moved by the pins 80 and 82, it retains the idler gear 50 in engagement with the gear wheel 52 by means of the notch 72 which is at the upper extent of the arm due to capturing the projection 78 of the bracket 54 at the moment when the idler gear engages the gear wheel 52. Simultaneous with the latching of the control arm 66 with the bracket 54, the latching member 64 is held in a non-operative position with reference to the gear wheel; that is, the dog 65 is out of contact with the teeth of the gear wheel (FIG. 3).

The action of the spring 84 causes the bracket 54 to turn clockwise about the shaft 56 so that the idler gear 50 is released from the gear wheel and the latching member 64 also turns in a clockwise direction causing the dog 65 to engage the teeth of the gear wheel locking it against further rotation.

As shown in FIGS. 2 and 3, the switches 86 and 90 are positioned adjacent the latching member and the pins of the gear wheel, respectively, which represent on-off switches for the drive motor.

The pin 94, which is on one face of the gear wheel, and the pins 80 and 82 (shown in dotted outline), which are on the opposite side of the gear wheel, are positioned with respect to one another a predetermined angular distance in order that the proper sequencing control for imparting rotation to the gear wheel 52 in timed relation with the movement of the control arm 66 as well as the latching member 64. Accordingly, the angular distance of the pin 94 from the pin 82 is such that when the latter moves the control arm 66, the pin 94 simultaneously engages the actuator 92 closing the switch 90 as shown in FIG. 4. This condition is established at the moment when the developing device is in its running position; that is, when the applicator roller 30 begins rotation and when the blades 40 and 42 are brought into contact against the surface 38 of the roller. In this position, the blade members are held stationary on the roller because of the fact that the gear wheel 52 is latched against movement by the latching member 64.

Referring now to FIG. 5, there is shown additional linkages which are mounted and disposed on the shaft 32 (FIG. 2) and shaft 98 (FIG. 2) on which are mounted the applicator roll and which carry an eccentric drive and linkages and connections to operate and control the blades 40 and 42. There are provided two elongated tubular carriers 100 and 102 having a rectangular cross section on which are mounted respectively the wiper blade 40 and the pressure blade 42. The carriers are positioned so that the axes running through the geometric centers of the tubes are in parallel alignment with the axis of rotation of the applicator roller 30.

The carrier 100 is permanently fixed to a hingedly mounted bracket 104 which is hinged at one end thereof on a stub shaft 106 which is rotatably mounted in suitable bearings 108, which, in turn, is received on a holding bracket contained on the main frame of the apparatus 36. The other end of the bracket 104 is hinged to an L-shaped arm 110 so that the arm and bracket are adapted to turn about a point 140. Accordingly, any movement of the arm 110 in a plane which also contains the bracket 104 will result in rotational movement of the bracket about its shaft 106. The other end of the leg portion of the L-shaped arm is rotatably secured to an eccentric drive plate 114, said drive plate being rotatably mounted on the shaft 98 which, in turn, is mounted on a bracket fixed to the main frame of the machine. The drive plate 114 becomes an eccentric member driving the L-shaped arm 110 and the bracket 104 about the point 115 so that as it turns in the direction shown by the arrow 118, there is imparted a reciprocating motion to the L-shaped arm 110.

Also affixed to the drive plate, common to the point of rotation at which the drive plate is attached, is the linkage 120 which is also connected to the bracket 122 to which is affixed the tubular carrier 102 for the pressure blade 42. One end of the bracket 122 is rotatably mounted on a support bracket 124 which is fixed to the main frame and which turns on a shaft 126. The other end of the bracket 122 is rotatably secured to the other end of the linkage 120 so that the two elements turn about the connecting point 128. As the drive plate 114 turns in a counterclockwise direction, it imparts motion both to the linkage 120 in a generally counterclockwise dircetion and the arm 110 is imparted a clockwise direction about its point of rotation 112. This directional movement of the linkage 120 and the arm 110 imparts movement in the support plate 122 and the support plate 104 so that the former turns clockwise about the shaft 126 and the latter counterclockwise about its shaft of rotation 106. This movement of the two support brackets which are affixed to the tubular carriers for each of the blades, causes them to move towards the roller 30, making contact therewith.

Referring again to FIGS. 2, 3, 4, and 5, it will be seen that the eccentric plate 114, and consequently the gear wheel 52, rotate in the same counterclockwise direction as shown in the figures. The position and dimensions of the various connecting elements 110 and 120, as well as the support plates 104 and 122, are selected so that for an initial angular displacement of the eccentric plate (arrow 118), the blades 40 and 42 are brought into contact relationship with the surface 38 of the applicator roller 30.

Another important feature of the present invention relates to the novel construction which permits the adjustment of the angle of the wiper blade 40 relative to a line of contact extending longitudinally along the surface 38 of the applicator roller and parallel to the axis of rotation of the shaft 32 thereof.

Referring to FIGS. 6, 7, and 8, there is shown the essential elements of the angular adjustment control including certain of the parts which appear in FIG. 5. For purposes of clarity and understanding the operation of the invention, FIGS. 6, 7, and 8 show only the elements essential to the angular setting of the wiper.

In the operation of a developer unit employed in a reproduction device of the type shown in FIG. 1, it is essential that the uniform and even application of liquid occur to the applicator roller 30 in order that a uniform and evenly developed reproduction be produced. Accordingly, it is extremely critical that the applicator roller 30, and its shaft rotate along an axis that is completely perpendicular to the pair of parallel planes passing through the lateral extremities of the roller. Any bowing or deflection of the roller from this axis of rotation will result in nonuniform application of liquid. This can be demonstrated by the force diagram that may be drawn when the blades 40 and 42, acting on the applicator roller 30, produce force vectors 130 and 132 extending in the radial direction toward the center of the roller and being of substantially the same absolute value and having their point of termination on the surface of the roller in diametrically opposed positions with reference to the central axis thereof. In practicing this invention, this condition can be achieved for any angular position of the wiper blade 40 with reference to the applicator roller surface 38.

The wiper blade 40 is mounted on the tubular carrier 100 in which the two laeral ends thereof are carried on the end plates 101 and 103 (FIG. 8) which, in turn, are mounted on the support plates 104 and 105 (FIG. 5 and 8), the mounting being such that the end plates are fastened to the support plate by means of a threaded fastener 134 through an elongated arcuate shaped opening 136.

To make an angular adjustment in the blade 40, the threaded fasteners 134 (FIG. 8) are loosened so that each of the end plates 101 and 103 are free to move in relation to their respective support plates 105 and 104. It will be observed that once the fasteners 134 at either end of the structure are loosened, the end plates are free to move in the elongated slot 136 about pivot pins 137 and 139 which pivotally attach plates 101 to plate 105 and 103 to plate 104, respectively; thereby permitting an angular adjustment of the tubular carrier 100 adjusting the angular relationship of the blade 40 on the surface 38. Once the final adjustment has been made, it is a simple matter for the operator to tighten the fasteners fixing the position. It is important to note that the adjusting movement of the end plates is along an arcuate path which produces a corresponding angular movement to the wiper blade but does not change the distance relationship of the blade to the roller along a radial line thereby maintaining a constant pressure. Only an angular adjustment of the blade face with respect to the surface of the roller can be made by moving the end plates within the elongated slots.

DESCRIPTION OF OPERATION

In FIG. 2 of the drawings, the device is shown in an at-rest position; that is, where the blades 40 and 42 are out of contact with the roller 30 and the switches 86 and 90 are open, that is, power to the gear wheel has been interrupted. To start the developing device in operation, the lever arm 60 is moved in the direction of the arrow 118 until the idler gear 50 makes contact and meshes with the gear wheel 52 as shown in FIG. 3. Simultaneously, the switch 86 closes, energizing the driving motor of roller 30, and consequently, of the driving gear 48 which starts to rotate in the direction of the arrow 118 (FIG. 3). The pin 80 moves away from the control arm 66 so that the latter is then imparted a clockwise rotational movement in the direction of the support bracket 54 causing the engagement of the projection 78 in the notch 72. The idler gear 50 is held in this position, that is, in meshing engagement with the gear wheel 52. Rotation of the gear wheel 52 causes the eccentric drive plate 114 to begin rotation in the direction of the arrow 118, thereby causing the L-shaped arm 110 and the linkage 120 in concert with the support plates 104 (FIG. 5) and 122 in such a manner that the blades 40 and 42 are successively applied against the surface 38 of the roller 30, respectively.

At the instant when these blades come into contact in relationship with the applicator roller, the pin 82 engages the notch 74 of the control arm 66 so that the latter is caused to turn in a counterclockwise direction until the arm returns to its initial rest position shown in FIG. 4. Upon the control arm 66 reaching this rest position, the bracket 54 is unlatched from its restricted position being held by the notch 72 and due to the tensioning force exerted by the coiled spring 84 is caused to rotate clockwise about its shaft 56. This results in the idler gear 50 being moved out of meshing engagement with the gear wheel 52 bringing into action the latching member 64 which arrests the movement of the gear wheel by moving the dog 65 into engagement with one of the teeth on the gear wheel.

The switch 86 is simultaneously opened upon arresting the rotation of the gear wheel and the pin 94 operates the actuator 92 of the switch 90 so as to maintain the roller 30 in rotation about its axis in the same direction.

The machine is now in its operating condition and capable of receiving a sheet of sensitized paper for processing through the developer which would carry it between the surface 38 of the roller 30 and the pressure blade 42, thus applying a controlled amount of liquid to the latent image-bearing surface of the copy sheet. This running position corresponds to the position of the various elements of the developer as shown in FIGS. 4 and 6.

The blades 40 and 42 are applied to the surface of the roller only after the roller shall have been rotated through a sufficient angular displacement in order to insure that at the moment the blades come into contact relationship with its surface, there is a sufficient amount of developing liquid applied to its surface in order to prevent damage by blade friction.

In order to bring the developing device to a stop and an inoperative condition, it is again necessary to operate the lever arm 60 in a counterclockwise direction. This movement of the control arm 60 causes the idler gear 50 to mesh with gear wheel 52 which is automatically released and the latter moves to the position shown in FIG. 2, namely out of meshing engagement with the gear wheel. At that momemt, the pin 80 moves against the lever arm 66 by engaging the notch 74, which releases the bracket 54. Upon release, the bracket 54 moves in a clockwise direction carrying with it the latching member 64 arresting the further rotation of the gear wheel and simultaneously opening the switch 86.

The rotation of the gear wheel from a rotating condition to one which is in an arrested or locked condition concurrently produces rotation in the eccentric drive plate 114 which imparts the necessary movement to the linkage 120, the L-shaped arm 110, and the support plate 104 causing the blades 40 and 42 to move into a retracted position (FIG. 5). It will be observed that both switches 86 and 90 are open, turning off the drive motor so that the roller 30 is stopped and the machine deactivated.

In order to adjust the angular position of the wiper blade 40 with reference to the roller 30, threaded fastener 134 is loosened and the end plates together with the tubular carriers move within the limits of the elongated opening 136 to achieve the proper angular adjustment of the blade. Once the proper setting has been achieved, it is only necessary to tighten down each of the fasteners at the lateral ends of the roller.

In order to insure that the same amount of change is made at each end of the blade, the elongated opening may be provided with suitable matched markings and a reference point to position the end plates.

It has been found that size of the angle formed between the blade and the surface of the roller controls the amount of developer liquid that ultimately remains on the surface. Referring to FIG. 7 of the drawings, the adjustment is shown at the point where the greatest angle of contact occurs between the blade and a plane drawn tangent to the surface of the roller at the point of contact. To increase the amount of fluid left on the roller, this angle is decreased which is achieved by setting the end plates at the lowermost extremity of the elongated opening.

As a further means for adjusting the position of the wiper blade 40 with reference to the applicator roller 30, there is provided an eccentric type bolt 112 at the point of rotation where the L-shaped arm 110 connects with the support plate 104. Accordingly, by loosening such bolt 112 finite adjustments of the relationship of the blade in terms of linear alignment with the surface of the roller 30 can be routinely achieved.

It is to be understood that while the invention has been described with great particularity and detail in terms of the various elements that comprise the unique and novel structure of a developer system, such detail has been presented for the purpose of achieving a full and complete understanding of the operation of the system and is not intended to limit the invention which has been defined by the claims appended hereto.

What is claimed is:

1. In a device for developing diazotype sensitized sheets by applying thereto a metered quantity of a developing liquid comprising:
   a drive motor;

an applicator roller to be rotatably driven by said motor and having a surface adapted to retain thereon said metered quantity of developing liquid;

liquid supply means for supplying an excess amount of said liquid agent to said roller surface;

wiper blade means for removing excess developing liquid from the roller surface, said wiper blade means including means to movably position the blade between an operative position and an inoperative position relative to said surface;

pressure blade means for pressing said sheets against said applicator roller to transfer the metered amount of liquid from said roller to the sheets, said pressure blade means including means to movably position said blade between an operative and an inoperative position relative to said surface, wherein said pressure blade in the operative condition provides a developing zone defined by the contact area between the blade and the surface through which zone the sensitized sheet passes to be developed; the improvement therein comprising:

a sequence control means including a gear and a lever arm in cooperative association with said gear, said lever arm being operable between a first position and a second position, a gear assembly operably mounted on said lever arm and movable between an engaged first position and disengaged second position position relative to said gear forming a mechanical interconnection between said drive motor and said gear to move said blades into their respective positions latching means;

said latching means latching the sequence control means in said first position to said gear assembly and in said second position rendering said gear assembly free to rotate relative to said sequence control.

2. The device as claimed in claim 1 wherein said lever arm includes the latching means for arresting the position of said blades when the gear assembly is operated to said disengaged second position.

3. The device as claimed in claim 1 wherein said lever arm is adapted to turn about a fixed axis of rotation having its center line parallel to the axes of rotation of said gear.

4. The device as claimed in claim 3 wherein said latching means includes a locking member integral with said lever arm for locking the movement of said gear against further rotation when said gear assembly is operated to said second position.

5. The device as claimed in claim 4 wherein said lever arm is manually operated.

6. The device as claimed in claim 1 including switch means for controlling said drive motor and the operation of said applicator roller, said switch means being responsive to the movement of said sequence control means.

7. The device as claimed in claim 6 wherein said switch means includes at least a pair of switches, requiring that one of said switches be closed and the other switch open in order to supply and maintain power to said drive motor.

8. The device as claimed in claim 1 in which the operation of the applicator roller starts in response to the manual operation of the lever arm to said first position causing the movement of the blades into their operating condition, and to said second position after said blades are operative for maintaining said blades in said operating condition.

9. The device as claimed in claim 1 wherein said gear means includes a series of actuating elements for moving said lever arm out of said first position and into said second position.

10. The device as claimed in claim 1 wherein said sequence control means includes a series of linkages connecting said blades with an eccentric drive plate, said last-named plate being mounted on a shaft common with said gear.

11. The device as claimed in claim 1 wherein said blade means comprises elongated support members having said blades longitudinally affixed thereto and adapted to be moved toward and away from said applicator roller.

12. The device as claimed in claim 11 wherein said support member for said wiper blade is secured between a pair of end plates, said end plates being angularly adjustable relative to said applicator roller.

13. A device for developing diazotype sensitized sheets by applying thereto a metered quantity of a developing liquid agent, comprising:

a drive motor;

an applicator roller to be rotatably driven by said drive motor and having a surface adapted to retain thereon said metered quantity of developing liquid;

liquid supply means for supplying an excess amount of liquid agent to said roller surface;

wiper blade means for removing excess developing liquid from the roller surface;

pressure blade means for pressing said sheets against said applicator roller to transfer the metered amount of fluid from the roller to the paper, said pressure blade providing a developing zone defined by the contact area between the blade and the surface through which zone the sensitize sheet passes to be developed;

the improvement therein comprising:

blade mounting means adapted to support said blades for movement between an operative and an inoperative position with said applicator roller while maintaining a predetermined force relationship therewith;

a gear assembly movable between an engaged and disengaged condition interconnecting said drive motor, said applicator roller means and said blade mounting means;

a sequence control element responsive to the position of said gear assembly in its engaged condition;

latching means associated with said sequence control element for initiating the movement of said blades into their operative position and for maintaining the blades in said last-named position.

14. The device as claimed in claim 13 wherein said latching means includes a first lever and a second lever, said first lever being operable between a first position in which said gear assembly is latched to said sequence control causing said blades to move into their operating position and a second position in which the gear assembly is free of said sequence control means.

15. The device as claimed in claim 13 wherein said sequence control includes switch means for energizing said drive motor simultaneously with the actuation of said latching means.

16. The device as claimed in claim 15 wherein said switch means comprise at least a pair of switches requiring one of said switches to be open and the other switch closed before power is supplied to said drive motor and to maintain said drive motor energized.

17. The device as claimed in claim 13 wherein said second lever locks said sequence control element when said first lever is in said second position.

18. In a device for developing diazotype sensitized sheets by applying thereto a metered quantity of a developing liquid agent comprising:
a drive motor;
an applicator roller to be rotatably driven by said drive motor and having a surface adapted to retain thereon said metered quantity of developing liquid;
liquid supply means for supplying an excess amount of liquid to said roller surface;
wiper blade means for removing said excess developing liquid from the roller surface, said wiper blade means being movable between an operative position and an inoperative position relative to said surface;
pressure blade means for pressing said sheets against said applicator roller to transfer the metered amount of fluid from the roller to the paper, said pressure blade means being movable between an operative and an inoperative position relative to said surface, wherein said pressure blade in said operative condition provides a developing zone defined by the contact area between the blade and the surface through which zone the sensitized sheet passes to be developed; the improvement comprising:
bracket means for mounting said blades in movable relationship to said applicator roller, end plate means affixed at least to those bracket means movably supporting said wiper blade therebetween, said last named bracket means having an arcuately shaped slot and guide member extending therethrough for adjustably attaching said end plate thereto for independently adjusting the angular position of said wiper blade to said applicator roll.

19. The device as claimed in claim 18 wherein said wiper blade means comprises an elongated tubular carrier for longitudinally having affixed thereon said blade.

* * * * *